3,506,690
PROCESS FOR THE PREPARATION OF EPOXIDES
Henri Normant, Paris, and Jean Francois Normant, Reims, France, assignors to Rhone-Poulenc S.A., Paris, France, a French body corporate
No Drawing. Filed Dec. 15, 1966, Ser. No. 601,869
Claims priority, application France, Dec. 17, 1965, 42,856
Int. Cl. C07d 1/02
U.S. Cl. 260—348                6 Claims

ABSTRACT OF THE DISCLOSURE

Aromatic epoxides are made from the corresponding carbonyl compounds by reaction with reducing agents obtained by dissolving alkali metals in phosphorus amides or esters.

---

This invention relates to a new process for the preparation of expoxides.

It is known [Henri Normant et al., B1 (1965), p. 1561] that alkali metals such as lithium, sodium and potassium dissolve readily in hexamethylphosphorotriamide [also called tris(dimethylamine)phosphine oxide, or HMPT for short] to give blue solutions containing radical anions:

$$\{O=P[N(CH_3)_2]_3\}^{\ominus}M^{\oplus} \qquad (I)$$

in which M represents a sodium, potassium or lithium atom. These may react as (a) basic or nucleophilic reagents displacing labile hydrogen atoms, or (b) reducing agents, giving up their lone electrons.

It is known [Henri Normant, C. R. (1965) 260, p. 5062–5063] that the radical anion of a compound of Formula I can transfer its electrons to certain unsaturated systems, thus producing a dianion according to the following scheme:

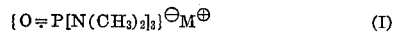

$$A=B + 2M^+(O=P\longleftarrow) \rightleftarrows M^+A^{\ominus}\text{—}B^{\ominus}M^+ + 2O=P\longleftarrow \qquad (II)$$

in which A=B is a substance with an unsaturated group and M is as hereinbefore defined, and that on addition of a proton donor such as water the dianion $$M^+A^{\ominus}\text{—}B^{\ominus}M^+$$

yields a compound of the formula:

$$HA\text{—}BH \qquad (III)$$

When A=B is benzophenone this procedure yields diphenylcarbinol.

It has now been found that on aging solutions of an alkali metal in HMPT, the compound (I) is converted to a compound which is also a reducing agent but whose behaviour is however different from that of compound (I). Instead of converting a ketone such as benzophenone to the corresponding alcohol, the action of an aged solution of an alkali metal in HMPT and then a proton donor results in a doubling reduction with the formation of an epoxide:

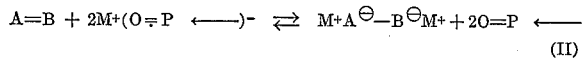

Aged solutions of alkali metals in other oxides of triaminophosphines, especially the immediate homologues of HMPT of formula:

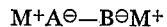

$$O=P[N(R')_2]_3 \qquad (IV)$$

in which R' represents a lower alkyl radical, react similarly on benzophenone and yield the epoxide. The same is the case with solutions of alkali metals in diorganophosphites, especially in dialkyl phosphites of formula:

$$\begin{array}{c} HP(OR')_2 \\ \parallel \\ O \end{array} \qquad (V)$$

in which R' represents a lower alkyl radical, preferably ethyl.

It has also been found that this formation of epoxides under the action of the aforementioned alkaline reagents takes place with any non-enolisable or slightly enolisable ketone and with any slightly enolisable or non-enolisable aldehyde. The reaction is favoured by the presence of an electron-attracting group in the α-position to the carbonyl group.

The present invention therefore comprises a process for the preparation of epoxides from non-enolisable or slightly enolisable ketones and aldehydes which comprises reacting said ketones or aldehydes with a reducing agent obtained by aging a solution of an alkali metal in a triaminophosphine oxide, or by reaction of an alkali metal with a diorganophosphite, and treating the product of the reduction with a proton donor.

The reducing agent obtained by reaction of an alkali metal with a diorganophosphite can be represented by the formula:

in which R represents an organic radical, preferably a lower alkyl radical, and M is as hereinbefore defined. Where the reducing agent is obtained by aging solutions of an alkali metal in a triaminophosphine oxide, it is thought that a compound of the formula:

in which the symbols are as hereinbefore defined, is formed, or at least that the product obtained behaves as if the compound (VII) were formed, for example according to a process such as the following:

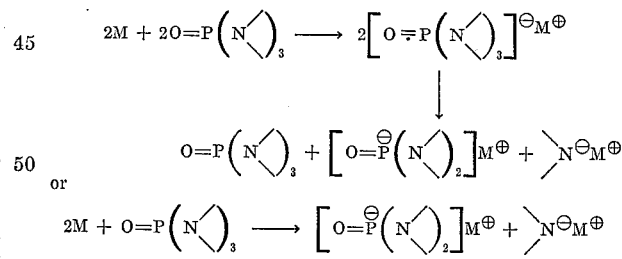

The preparation of 1 mol of compound (VI) thus requires 1 gram atom of alkali metal per 1 mol of diorganophosphite, and the preparation of 1 mol of compound (VII) requires 2 gram atoms of alkali metal per 1 mol of triaminophosphine oxide.

To prepare the aged solutions of an alkali metal in a triaminophosphine oxide, a mixture of an alkali metal and of a triaminophosphine oxide in the proportions of 2 gram atoms of alkali metal per 1 mol of triaminophosphine oxide is heated, for example to about 60° C., until the metal is completely dissolved. It is generally preferable to use a slightly higher proportion of triaminophosphine oxide and, furthermore, it is advantageous to add a small amount of an inert organic diluent, i.e. a liquid organic diluent unreactive under the operating conditions employed, before adding the alkali metal to the triaminophosphine oxide. The diluent is preferably an ether, for example tetrahydrofuran. As the alkali metal, potassium, lithium or sodium may be employed, potassium and lithium being preferred. When all the alkali metal has been attacked a crystalline, generally white, paste is obtained which is ready to use.

The alkali metal-diorganophosphite reagent may be prepared in the same way by reacting an alkali metal (Na, K or Li) with a diorganophosphite with heating, for example at about 60° C., in order to accelerate the reaction in the presence or absence of an inert organic diluent. An alkali metal hydride or amide can also be reacted with the diorganophosphite to obtain the alkali metal-diorganophosphite reagent.

As regards the reaction which gives rise to the epoxide, it appears that it could be formulated in the following manner:

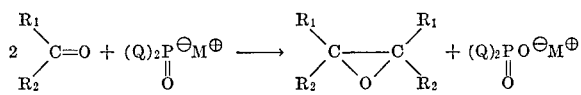

in which Q represents an OR or $N(R)_2$ group, R being as defined above, M is as hereinbefore defined, $R_1$ represents an organic group and $R_2$ represents an organic group or a hydrogen atom. The symbols $R_1$ and $R_2$ may, for example, both be phenyl radicals or substituted phenyl (e.g. diphenylyl) radicals, or $R_1$ may represent a phenyl or substituted phenyl radical and $R_2$ may represent an alkyl radical; good yields of the epoxide are obtained in such cases. Examples of suitable carbonyl starting materials are benzophenone, acetophenone, diphenylyl phenyl ketone and benzaldehyde which give as final products tetraphenylethylene oxide, 1,2-diphenyl-1,2-dimethylethylene oxide, 1,2-di(diphenylyl)-1,2-diphenylethylene oxide and 1,2-diphenylethylene oxide, respectively.

In order to convert the carbonyl compound (ketone or aldehyde) to an epoxide, the carbonyl compound is initially reacted with the reducing agent and the product obtained is then treated with a proton donor, which generally is simply water. As is apparent from the preceding reaction scheme, the reaction requires an amount of reducing agent corresponding to 1 mol of compound (VI) or (VII) per 2 mols of carbonyl compound, although in the case where the reducing agent is the reaction product of an alkali metal with a diorganophosphite it is preferable to use an excess of reducing agent.

The carbonyl compound is preferably employed in an inert organic diluent, such as a saturated hydrocarbon or an ether, e.g. tetrahydrofuran.

In the case where the reducing agent is the product of the reaction of alkali metal and a diorganophosphite, it is advisable to add a little triaminophosphine oxide, preferably HMPT, to the product of this reaction before adding the carbonyl compound. The amount of triaminophosphine oxide is not critical.

The reaction of the carbonyl compound with the reducing agent is carried out at a low temperature. The reagents are mixed gradually and preferably below 0° C., for example at a temperature within the range −30° C. and 0° C.; it is preferred to add the carbonyl compound to the the reducing medium. When mixing is complete, the temperature may again be allowed to rise, for example, to 20–25° C., and at times the mixture may even be gently heated (e.g. to about 40° C.).

Depending on the carbonyl compound employed and the reducing agent used, the reaction mixture becomes various shades of colour, which all turn to a tea colour at the end of the reaction.

The following stage, the reaction with a proton donor, generally employs water, and is carried out under conditions which do not cause the resulting epoxide to open. For example, the product of the reduction reaction is poured on to a mixture of ice and hydrochloric acid or ice and ammonium chloride. The organic phase is then extracted. The separation of the epoxide does not pose any particular difficulty.

When the reducing agent is an aged solution of an alkali metal in a triorganophosphine oxide, an amine arising from the reducing agent (dimethylamine in the case of HMPT) is formed beside the epoxide; the scheme given above for the formation of the reducing agent accounts for this.

The following examples illustrate the invention.

EXAMPLE 1

3.9 g. of potassium are introduced into 30 cc. of HMPT, then 10 cc. of tetrahydrofuran are added and the mixture heated gently (50–60° C.) until the metal has completely disappeared. On cooling, a slightly coloured suspension is obtained. A solution consisting of 18.2 g. (0.1 mol) of benzophenone and 30 cc. of tetrahydrofuran is then added dropwise to this suspension maintained at about 0° C. The medium becomes a blood red colour. After adding the whole of the benzophenone, the mixture is left for 24 hours with stirring and then hydrolysed with a mixture of ice and hydrochloric acid (1:2). The product is then extracted with benzene, the organic layer is washed with an aqueous solution of sodium bicarbonate and then dried over anhydrous sodium sulphate. After removing the tetrahydrofuran in vacuo, a crystalline product is obtained and is filtered off. The filtrate, which essentially consists of benzophenone contaminated with a little benzhydrol, is distilled in a very high vacuum. A residue remains which crystallises and is combined with the crystals previously obtained. After recrystallising the whole of these crystals from ethyl acetate, there are obtained 10.9 g. of tetraphenylethylene oxide melting at 209° C.

This product is identical with the product which is obtained by oxidising tetraphenylethylene with p-nitrobenzoic acid.

EXAMPLE 2

1.15 g. (0.05 gram atom) of sodium are added to a mixture of 6.9 g. (0.05 mol) of diethylphosphite and 20 cc. of tetrahydrofuran. The mixture is gently heated (50–60° C.) until the metal has completely disappeared and then, after cooling, 25 cc. of HMPT are added followed dropwise by a solution consisting of 13.65 g. (0.075 mol) of benzophenone and 30 cc. of tetrahydrofuran. The mixture becomes a yellowish brown colour and the temperature of the medium is brought to 20–25° C., after which the mixture is left for 4 days. The mixture is then hydrolysed and treated as indicated in the preceding example. There are thus obtained 12.3 g. (yield 94.2%) of tetraphenylethylene oxide melting at 209° C.

EXAMPLE

By operation under the same conditions as in Example 2 but using potassium instead of sodium, tetraphenylethylene oxide is again obtained, the yield this time being 69.2% relative to the benzophenone.

EXAMPLE 4

By operating as in Example 2 but using lithium instead of sodium, tetraphenylethylene oxide is again obtained, the yield being 63.6% relative to the benezophenone.

EXAMPLE 5

By proceeding as in Example 2 but replacing the sodium by potassium and replacing the benzophenone by the same molar amount of acetophenone, 1,2-diphenyl-1,2-dimethylethylene oxide (a cis-trans mixture) is obtained in a yield of 51% relative to the acetophenone.

EXAMPLE 6

By proceeding as in Example 2 but replacing the benzophenone by diphenylyl phenyl ketone of formula $C_6H_5—C_6H_4COC_6H_5$, an epoxide of formula:

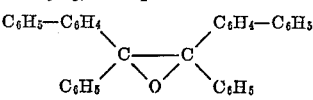

i.e. 1,2-(diphenylyl)-1,2-diphenylethylene oxide, consisting of 65.7% of an isomer melting at 262° C. and 34.3% of an isomer melting at 216° C., is obtained in a yield of 43.2% relative to the starting ketone.

EXAMPLE 7

By proceeding as in Example 2 but replacing the benzophenone by 10.6 g. of benzaldehyde, there are obtained 5 g. of 1,2-diphenylethylene oxide melting at 118–120° C.

We claim:
1. Process for the preparation of an epoxide of the formula:

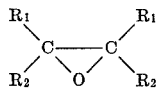

in which $R_1$ represents phenyl and $R_2$ represents hydrogen, lower alkyl or phenyl, which comprises contacting at $-30°$ C. to $40°$ C. a carbonyl compound of the formula:

in which $R_1$ and $R_2$ are as hereinbefore defined, with a reduced agent of formula:

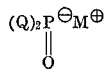

wherein Q is OR or $N(R)_2$, R is lower alkyl, and M is sodium, potassium, or lithium, and contacting the product at a temperature of about 0° C. with aqueous hydrochloric acid or ammonium chloride.

2. Process according to claim 1 wherein the carbonyl starting material is benzophenone, acetophenone, or benzaldehyde.

3. Process according to claim 1 in which Q is $-N(CH_3)_2$.

4. Process according to claim 1 in which Q is $-OC_2H_5$.

5. Process according to claim 1 in which the carbonyl compound is contacted with the reducing agent in the presence of tetrahydrofuran.

6. Process according to claim 1 in which the carbonyl compound is contacted with the reducing agent at a temperature within the range $-30°$ C. to $0°$ C.

References Cited

Milinovskii, M.S., Epoxides and their Derivatives, (1965) p. 98.

Houben-Weyl, Methoden der Organischen Chemie, vol. 6/3 (1965), p. 417.

NORMA S. MILESTONE, Primary Examiner

U.S. Cl. X.R.

260—551, 921, 967